United States Patent
Tamaru (10) Patent No.: US 11,650,123 B2
(45) Date of Patent: May 16, 2023

(54) CASE AIRTIGHTNESS EVALUATION METHOD AND EVALUATION DEVICE

(71) Applicant: TOYOTA JIDOSHA KABUSHIKI KAISHA, Toyota (JP)

(72) Inventor: Koji Tamaru, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 384 days.

(21) Appl. No.: 17/140,180

(22) Filed: Jan. 4, 2021

(65) Prior Publication Data

US 2021/0231522 A1 Jul. 29, 2021

(30) Foreign Application Priority Data

Jan. 24, 2020 (JP) .............................. JP2020-010342

(51) Int. Cl.
  *G01M 3/36* (2006.01)
  *G01M 3/32* (2006.01)
  *H01M 50/569* (2021.01)

(52) U.S. Cl.
  CPC ............ *G01M 3/36* (2013.01); *G01M 3/3263* (2013.01); *H01M 50/569* (2021.01); *H01M 2200/20* (2013.01)

(58) Field of Classification Search
  CPC .......... G01M 3/26; G01M 3/00; G01M 3/042; G01M 3/12; G01M 3/045; G01M 3/10; G01M 3/007; G01M 3/207; G01M 3/02; G01M 3/027; G01M 3/04; G01M 3/16; G01M 3/24; G01M 3/20; G01M 3/06; G01M 3/226; G01M 3/227; G01M 3/329; G01M 3/36; G01M 3/3263; G01M 3/3272; H01L 2224/78; H01L 2224/78301; H01L 2224/786; H01L 2224/851; H01L 24/78; H01L 2924/00014; H01L 2924/01004; H01L 2924/01033; H01L 2924/01042; H01L 2224/48; H01L 2924/00012; H01M 2200/20; H01M 50/22; H01M 50/24; H01M 50/569; Y02E 60/10
  See application file for complete search history.

(56) References Cited

U.S. PATENT DOCUMENTS 6,163,134 A * 12/2000 Powers ............... H01M 10/345
320/147
2014/0251018 A1 9/2014 Ijuin et al.

FOREIGN PATENT DOCUMENTS

CN 108287042 B * 11/2021 ............. G01M 3/26
JP 10-197392 A 7/1998
(Continued)

*Primary Examiner* — John Fitzgerald
*Assistant Examiner* — Truong D Phan
(74) *Attorney, Agent, or Firm* — Oblon, McClelland, Maier & Neustadt, L.L.P.

(57) ABSTRACT

A case airtightness evaluation method evaluates airtightness of a case mounted at a vehicle. A pressure measuring step of the evaluation method includes pressurizing or depressurizing air in the case, allowing pressure in the case to stabilize, and then measuring a pressure change in the case. During the measurement of the pressure change, a deformation amount acquiring step acquires a deformation amount of a specific location of the case. Based on the acquired deformation amount, a correcting step corrects the measured pressure change. Based on the corrected pressure change, an evaluating step evaluates airtightness of the case.

8 Claims, 5 Drawing Sheets

(56) References Cited

FOREIGN PATENT DOCUMENTS

| | | |
|---|---|---|
| JP | 2006-153835 A | 6/2006 |
| JP | 2013-96709 A | 5/2013 |
| JP | 2016-51564 A | 4/2016 |
| JP | 2018-073785 A | 5/2018 |

* cited by examiner

CASE AIRTIGHTNESS EVALUATION METHOD AND EVALUATION DEVICE

CROSS-REFERENCE TO RELATED APPLICATION

This application is based on and claims priority under 35 USC 119 from Japanese Patent Application No. 2020-010342 filed on Jan. 24, 2020, the disclosure of which is incorporated by reference herein.

BACKGROUND

Technical Field

The present disclosure relates to a method and device for evaluating airtightness of a case mounted at a vehicle such as a road vehicle or the like.

Related Art

Japanese Patent Application Laid-Open (JP-A) No. 2018-073785 discloses a battery pack to be mounted at a vehicle. In this battery pack, a cell stack, which is a high-voltage battery, is accommodated inside a case. The case is structured by combining a lower case with an upper case, forming a substantially cuboid shape.

SUMMARY

An air leak test may be conducted on the case of the battery pack described above in order to test waterproofing. In this air leak test, for example, air in the case is pressurized or depressurized and, after pressure in the case has stabilized, a change of pressure in the case is measured. Hence, air leakage from the case is judged (evaluated).

However, for example, when the upper case of the case described above is fabricated of resin, the upper case is deformed by the pressurization or depressurization of air in the case. During the measurement of the change of pressure, deformation of the upper case continues due to creep. As a result, the internal volume of the case changes, and it may not be possible to evaluate air leakage from the case (airtightness) accurately.

In consideration of the circumstances described above, an object of the present disclosure is to provide a case airtightness evaluation method and evaluation device that may evaluate airtightness of a case accurately.

A case airtightness evaluation method according to a first aspect of the present disclosure includes: a pressure measuring step including pressurizing or depressurizing air in the case, allowing pressure in the case to stabilize, and thereafter, measuring a pressure change in the case; a deformation amount acquiring step of, during the measuring of the pressure change, acquiring a deformation amount of a specific location of the case; a correcting step of correcting the measured pressure change based on the acquired deformation amount; and an evaluating step of evaluating airtightness of the case based on the corrected pressure change.

In the first aspect, the meaning of the term "case" is intended to include a vessel, container, box or the like for accommodating a component of a vehicle.

The case airtightness evaluation method according to the first aspect evaluates airtightness of a case mounted at a vehicle. In the pressure measuring step of this evaluation method, air inside the case is pressurized or depressurized and, after pressure in the case has stabilized, a pressure change in the case is measured. In the deformation amount acquiring step, a deformation amount of the specific location of the case is acquired during the measurement of the pressure change. In the correcting step, the measured pressure change is corrected based on the acquired deformation amount. In the evaluating step, airtightness of the case is evaluated based on the corrected pressure change. According to this evaluation method, because a measurement error of the pressure change due to deformation of the case is corrected in the correcting step, airtightness of the case may be evaluated accurately in the evaluating step.

In a case airtightness evaluation method according to a second aspect of the present disclosure, in the first aspect, the specific location is plural locations of the case, and the deformation amount of the specific location acquired in the deformation amount acquiring step is an average value of deformation amounts of the plural locations.

In the deformation amount acquiring step of the case airtightness evaluation method according to the second aspect, an average value of deformation amounts of the plural locations of the case is acquired to serve as the deformation amount of the specific location of the case. Thus, the deformation amount of the case may be acquired more accurately than when a deformation amount of only one location of a case is acquired.

In a case airtightness evaluation method according to a third aspect of the present disclosure, in the first aspect, the specific location includes a location of the case at which a deformation caused by the pressurizing or depressurizing is relatively large.

In the deformation amount acquiring step according to the case airtightness evaluation method according to the third aspect, the deformation amount is acquired at a location at which deformation of the case due to pressurization or depressurization of the air in the case is relatively large. Thus, a change in deformation amount may be identified more easily than when a deformation amount is acquired at a location at which this deformation is relatively small.

In a case airtightness evaluation method according to a fourth aspect of the present disclosure, in the third aspect, the location at which the deformation is relatively large is verified by measurement using an actual specimen of the case or by computer-aided engineering (CAE) analysis.

In the deformation amount acquiring step according to the case airtightness evaluation method according to the fourth aspect, during the measurement of the pressure change in the case, the deformation amount is acquired at the location at which deformation of the case is relatively large. This location at which the deformation is relatively large may be verified by measurements using an actual specimen of the case or by computer-aided engineering (CAE) analysis. With measurements using the actual specimen of the case, the location may be verified accurately, whereas with CAE analysis, the location may be verified quickly and easily.

In a case airtightness evaluation method according to a fifth aspect of the present disclosure, in the first aspect, when the measured pressure change is represented by $\Delta P$, the acquired deformation amount is represented by $\Delta x$, the corrected pressure change is represented by $\Delta P'$, and a correction coefficient that is determined by verifying a correlation between deformation amounts of the case and pressure changes in the case is represented by $\alpha$, the verifying including measurements using an actual specimen of the case or CAE analysis, the correcting step includes calculating $\Delta P'$ from $\Delta P' = \Delta P - \alpha \Delta x$.

In the correcting step according to the case airtightness evaluation method according to the fifth aspect, the corrected value ΔP' of the pressure change is calculated by subtracting, from the change amount ΔP measured in the pressure measuring step, the deformation amount Δx acquired in the deformation amount acquiring step multiplied by the correction coefficient α. This correction coefficient α is determined by verifying a correlation between deformation amounts of the case and pressure changes in the case, by measurements using the actual specimen of the case or by CAE analysis. Thus, the corrected value ΔP' may be found accurately.

In a case airtightness evaluation method according to a sixth aspect of the present disclosure, in the first aspect, the case is a case of a battery pack.

Airtightness of a case of a battery pack may be evaluated accurately with the case airtightness evaluation method according to the sixth aspect. Therefore, when a high degree of waterproofing is required for the case, accuracy of evaluation of the waterproofing is improved.

A case airtightness evaluation device according to a seventh aspect of the present disclosure includes: a pressure measurement section that pressurizes or depressurizes air in the case, allows pressure in the case to stabilize, and thereafter, measures a pressure change in the case; a deformation amount acquisition section that, during the measuring of the pressure change by the pressure measurement section, acquires a deformation amount of a specific location of the case; a correction section that corrects the measured pressure change based on the deformation amount acquired by the deformation amount acquisition section; and an evaluation section that evaluates airtightness of the case based on the pressure change corrected by the correction section.

The case airtightness evaluation device according to the seventh aspect evaluates airtightness of a case mounted at a vehicle. The pressure measurement section of this evaluation device pressurizes or depressurizes air inside the case and, after pressure in the case has stabilized, measures a pressure change in the case. The deformation amount acquisition section acquires a deformation amount of the specific location of the case during the measurement of the pressure change. The correction section corrects the pressure change measured by the pressure measurement section based on the deformation amount acquired by the deformation amount acquisition section. The evaluation section evaluates airtightness of the case based on the pressure change corrected by the correction section. According to this evaluation device, because a measurement error of the pressure change due to deformation of the case is corrected by the correction section, airtightness of the case may be evaluated accurately by the evaluation section.

As described above, the case airtightness evaluation method and evaluation device according to the present disclosure may evaluate airtightness of a case accurately.

BRIEF DESCRIPTION OF THE DRAWINGS

Exemplary embodiments of the present disclosure will be described in detail based on the following figures, wherein.

DETAILED DESCRIPTION

Below, a case airtightness evaluation device 10 (below referred to simply as "the evaluation device 10") according to an exemplary embodiment of the present disclosure is described using FIG. 1 to FIG. 7.

Figure 1:
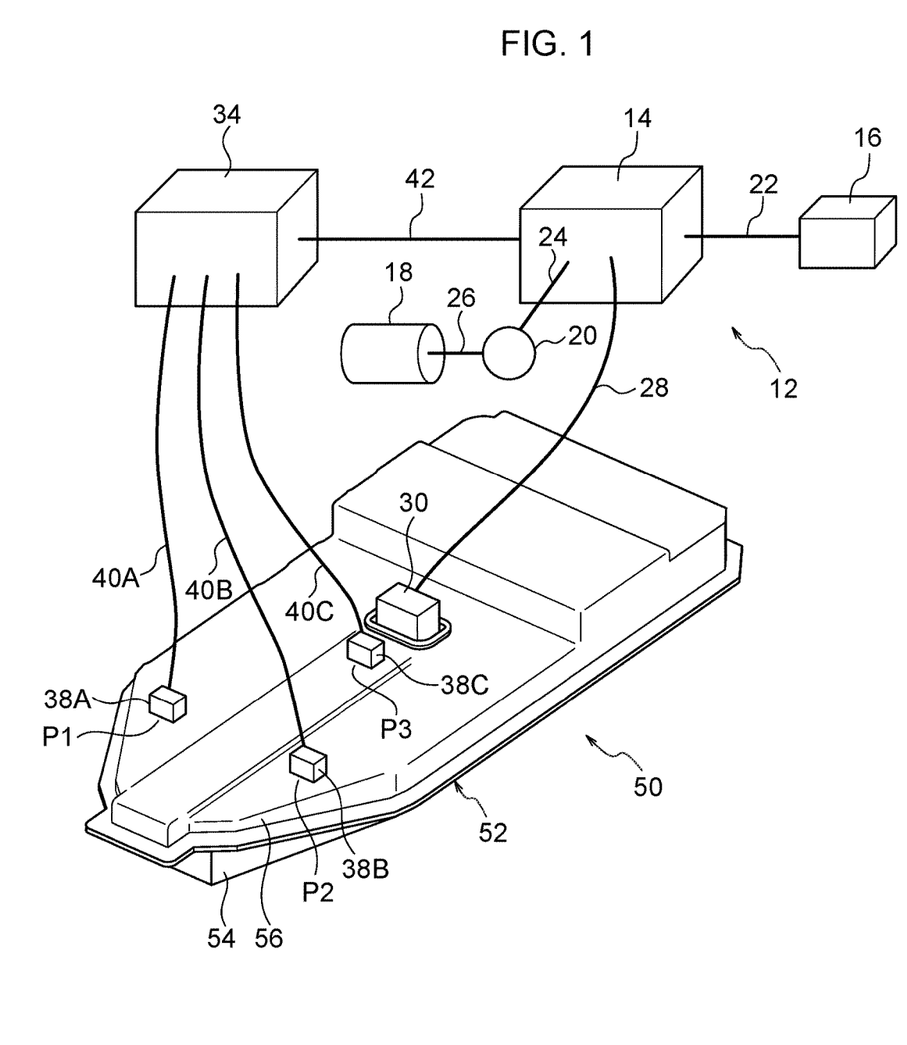
FIG. 1 is a perspective view showing a case airtightness evaluation device according to an exemplary embodiment of the present disclosure and a battery pack, airtightness of a case of which is evaluated by the evaluation device.

As shown in FIG. 1, the evaluation device 10 is equipped with a leak tester 12, a control apparatus 34, and a plural number (three in this exemplary embodiment) of displacement sensors 38A, 38B and 38C. The evaluation device 10 is a device for embodying a case airtightness evaluation method (below referred to simply as "the evaluation method") according to the exemplary embodiment of the present disclosure. In the present exemplary embodiment, the evaluation device 10 is used to evaluate airtightness of a case 52 of a battery pack 50, which is shown in FIG. 1.

This battery pack 50 is mounted below a floor of a vehicle that is a road vehicle, which is not shown in the drawings. The battery pack 50 supplies electric power to an electric motor that drives the road vehicle. A plural number of battery modules, which are not shown in the drawings, and a battery electronic control unit (ECU), which is not shown in the drawings, are accommodated in the case 52 of the battery pack 50. The case 52 forms a long, narrow, flat box shape. Each battery module is structured by plural cells (battery cells), which are, for example, lithium-ion batteries and are electrically connected to one another. To ascertain states of the battery modules, the battery ECU measures voltages, currents, temperatures and the like of the battery modules and monitors inputs and outputs of the battery modules.

Figure 2:
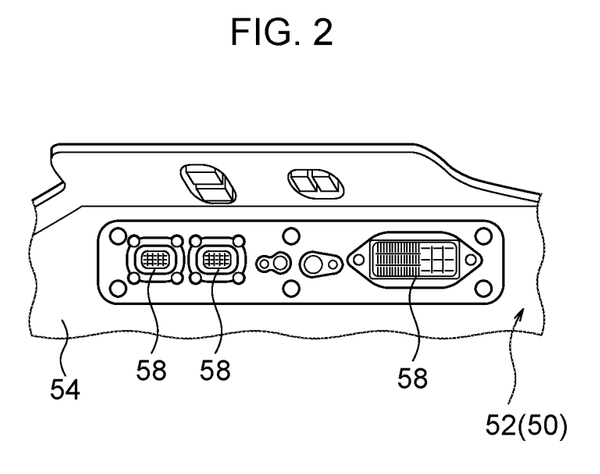
FIG. 2 is a perspective view showing partial structure of the case.

The case 52 described above is provided with a lower case 54, which forms a box shape of which an upper side is open, and an upper case 56, which forms a box shape of which the lower side is open. The lower case 54 is constituted of a light metal such as, for example, an aluminium alloy or the like. The upper case 56 is constituted of, for example, a resin. Flange portions, which are provided at end portions at the respective open sides of the lower case 54 and upper case 56, are superposed with one another and the flanged portions are fixed to one another by means of bolt-fastening or the like. As shown in FIG. 2, plural connectors 58 are provided at one length direction end portion of the lower case 54 (a front end portion in the state in which the battery pack 50 is mounted to the road vehicle). The connectors 58 are, for example, female connectors. When airtightness of the case 52 is to be evaluated, for example, a fitting fabricated using male connectors is attached to these connectors 58. Thus, the connectors 58 are sealed up.

The leak tester 12 corresponds to a pressure measurement section of the present disclosure, and a pressure measuring step is embodied by the leak tester 12. The leak tester 12 is, for example, a differential pressure-type leak tester. As shown in FIG. 1, the leak tester 12 is provided with a leak tester main body 14 that structures a main body portion of the leak tester 12, a master chamber 16, a vacuum pump 18 and a precision regulator 20. The leak tester main body 14 is connected with the master chamber 16 via piping 22. The master chamber 16 is a highly airtight structure. The leak tester main body 14 is connected with the precision regulator 20 via piping 24, and the precision regulator 20 is connected with the vacuum pump 18 via piping 26. One end portion of piping 28 is connected to the leak tester 12, and another end portion of the piping 28 is connected to a workpiece connection fitting 30. The workpiece connection fitting 30 is a structure that connects to the case 52, which is the workpiece. In the present exemplary embodiment, as an example, the workpiece connection fitting 30 is connected to a substantially central portion in an upper face view of the upper case 56.

A valve, a differential pressure sensor and the like, which are not shown in the drawings, are provided in the leak tester main body 14. When airtightness (air leakage) of the case 52 is tested by the leak tester 12, first, the vacuum pump 18 is operated, depressurizing air in the case 52 and air in the master chamber 16. Then, the interior of the case 52 and the interior of the master chamber 16 are isolated from the vacuum pump 18 and pressures in the case 52 and in the master chamber 16 are allowed to stabilize. Next, the interior of the case 52 is isolated from the interior of the master chamber 16 and the leak tester waits until the pressure in the case 52 is stable. Then, a pressure difference between the interior of the case 52 and the interior of the master chamber 16 is measured by the aforementioned differential pressure sensor. The measured pressure difference is understood to be a pressure change of the interior of the case 52. If this pressure difference is represented by $\Delta P$ (Pascals), a duration of measurement of the pressure difference by the differential pressure sensor is represented by T (seconds), and an equivalent volume is represented by Ve (milliliters), then an air leakage amount Q (milliliters/minute) from the case 52 may be calculated by the following expression (1).

$$Q = Ve \times \frac{\Delta P}{1.013 \times 10^5} \times \frac{60}{T} \quad (1)$$

The above-mentioned equivalent volume Ve is a coefficient taking into account all pressure change factors relating to the measurement, including the workpiece (the case 52 in this situation) and the leak tester 12, that is, a coefficient taking into account the effects of volume changes due to internal pressures of the workpiece, the differential pressure sensor and the like. The equivalent volume Ve is measured by, for example, a dedicated measurement section provided at the leak tester main body 14.

The leak tester main body 14 described above is electronically connected to the control apparatus 34. The control apparatus 34 includes a central processing unit (CPU) 34A, read-only memory (ROM) 34B, random access memory (RAM) 34C, storage 34D, and an input/output interface 34E. The CPU 34A, ROM 34B, RAM 34C, storage 34D and input/output interface 34E are connected to be capable of communicating with one another via a bus 34F.

Figure 4:
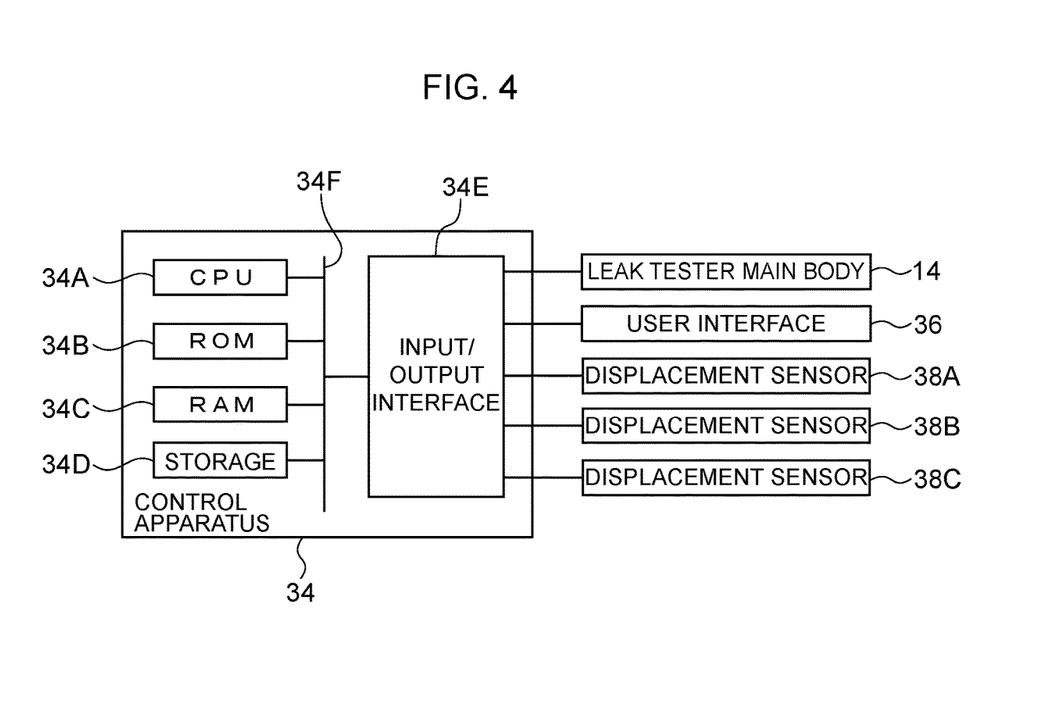
FIG. 4 is a block diagram showing structures of principal portions of the evaluation device.
Figure 5:
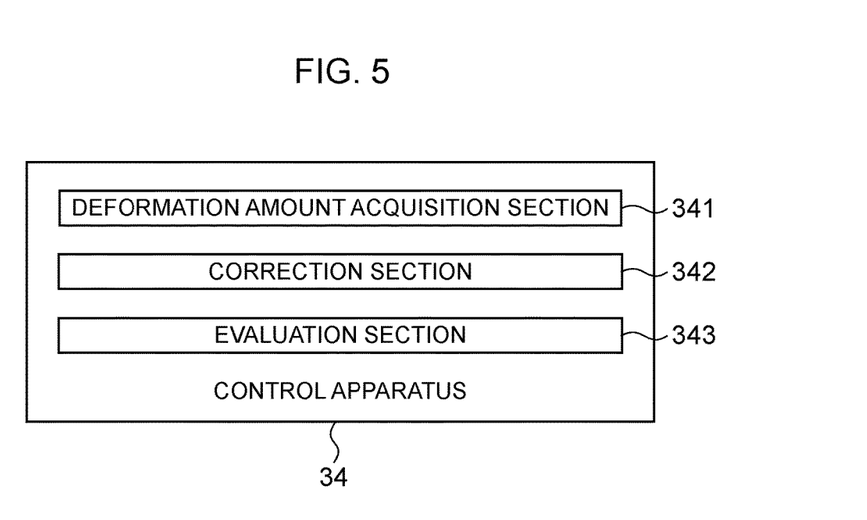
FIG. 5 is a block diagram showing an example of functional structures of a control apparatus provided at the evaluation device.
Figure 6:
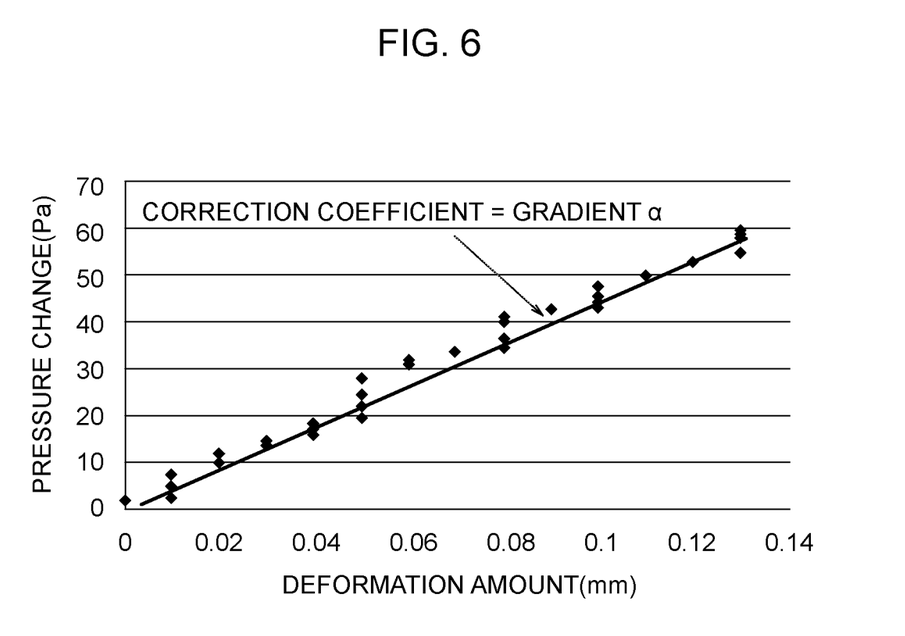
FIG. 6 is a graph showing a correlation between pressure changes in the case and deformation amounts of the case.

The CPU 34A is a central arithmetic processing unit that executes various programs and controls respective parts. That is, the CPU 34A reads a program from the ROM 34B and executes the program, using the RAM 34C as a workspace. Accordingly, the control apparatus 34 functions as a deformation amount acquisition section 341, a correction section 342 and an evaluation section 343, which are shown in FIG. 4. In the present exemplary embodiment, various programs and various kinds of data are stored in the ROM 34B. The storage 34D includes a hard disk drive (HDD) or solid state drive (SSD). The storage 34D stores various programs, including an operating system, and various kinds of data.

In addition to the leak tester main body 14, a user interface 36 and one displacement sensor or the plural (three in this exemplary embodiment) displacement sensors 38A, 38B and 38C are electronically connected to the input/output interface 34E. The user interface 36 is provided with, for example, a display device that is a display screen and an input device that is a keyboard. The user interface 36 is not shown in the drawing of FIG. 1. In FIG. 1, the reference symbols 40A, 40B and 40C indicate wires connecting the displacement sensors 38A, 38B and 38C with the control apparatus 34, and the reference symbol 42 indicates a wire connecting the control apparatus 34 with the leak tester main body 14.

Figure 3:
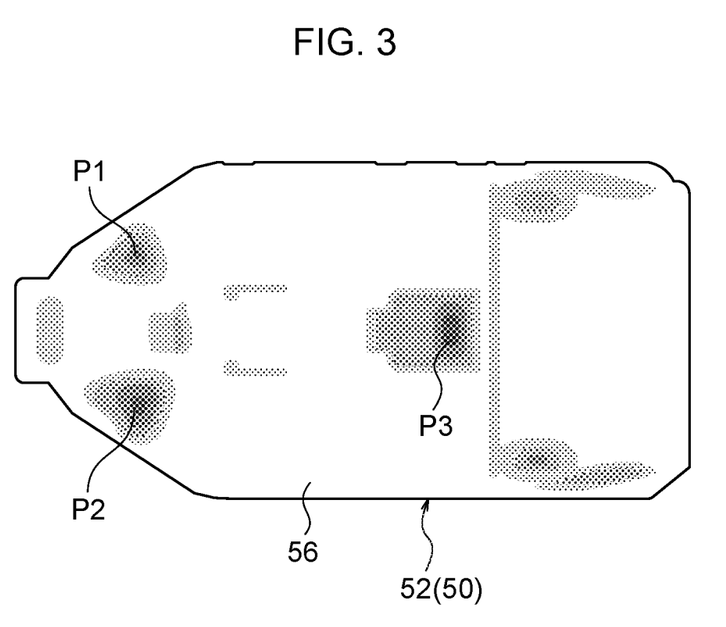
FIG. 3 is an analytical diagram showing an example of results of CAE analysis of a deformed shape of the case.

The three displacement sensors 38A, 38B and 38C are, for example, non-contact displacement sensors such as optical sensors, ultrasonic sensors, laser focus sensors or the like, or contact sensors such as transducer sensors, scale sensors or the like. The three displacement sensors 38A, 38B and 38C measure deformation amounts of plural locations (specific locations) of the upper case 56 in the state in which the air in the case 52 is depressurized by the vacuum pump 18. More specifically, the locations at which the deformation amounts are measured by the three displacement sensors 38A, 38B and 38C are locations at which deformations caused by this depressurization are relatively large. In the present exemplary embodiment, these locations at which deformations are relatively large are verified beforehand by computer-aided engineering (CAE) analysis. FIG. 3 shows an analytical diagram of an example of results of the CAE analysis. In FIG. 3, the plural locations marked with darker spots are locations at which deformations are relatively large. In the present exemplary embodiment, deformation amounts at points P1, P2 and P3, which are three of the above-mentioned plural locations, are measured by, respectively, the displacement sensors 38A, 38B and 38C.

By the CPU 34A executing a program as mentioned above, the control apparatus 34 with the structure described above functions as the deformation amount acquisition section 341, correction section 342 and evaluation section 343 shown in FIG. 4. The deformation amount acquiring step is implemented by the deformation amount acquisition section 341, the correcting step is implemented by the correction section 342, and the evaluating step is implemented by the evaluation section 343. More specifically, during the measurement of the pressure difference (the pressure change) by the leak tester 12 (the pressure measurement section), the deformation amount acquisition section 341 acquires a deformation amount of the case 52. The correction section 342 corrects the pressure change measured by the leak tester 12 on the basis of the deformation amount acquired by the deformation amount acquisition section 341. The evaluation section 343 evaluates airtightness (air leakage) of the case 52 on the basis of the pressure change corrected by the correction section 342.

The deformation amount acquisition section 341 acquires an average value of the deformation amounts at the points P1, P2 and P3 to serve as the deformation amount of the case 52. More specifically, if a deformation amount measured by the displacement sensor 38A is represented by $\Delta x1$, a deformation amount measured by the displacement sensor 38B is represented by $\Delta x2$ and a deformation amount measured by the displacement sensor 38C is represented by $\Delta x3$, then the deformation amount acquisition section 341 calculates an average value of $\Delta x1$, $\Delta x2$ and $\Delta x3$ to serve as a deformation amount $\Delta x$ of the case 52. A unit of measurement of $\Delta x$, $\Delta x1$, $\Delta x2$ and $\Delta x3$ is, for example, millimeters.

The correction section 342 described above finds a corrected value of the pressure change by subtracting, from the pressure change (pressure variation) measured by the leak tester 12, the deformation amount acquired by the deformation amount acquisition section 341 multiplied by a predetermined correction coefficient. More specifically, if the pressure change measured by the leak tester 12 is represented by $\Delta P$, the deformation amount acquired by the deformation amount acquisition section 341 is represented by $\Delta x$, the above-mentioned corrected value is represented by $\Delta P'$, and the correction coefficient is represented by $\alpha$, the correction section 342 calculates the corrected value $\Delta P'$ from $\Delta P' = \Delta P - \alpha \Delta x$. This correction coefficient $\alpha$ is determined by verifying a correlation between pressure changes in the case 52 and deformation amounts of the case 52, by measurements using an actual specimen of the case 52 or by CAE analysis. The correction coefficient $\alpha$ is found from the gradient of a graph of a plot (for example, see FIG. 6) plotting data obtained from the above-mentioned measurements or CAE analysis.

The evaluation section 343 evaluates airtightness (air leakage) of the case 52 by making a determination as to whether the corrected value $\Delta P'$ is less than a prescribed value. More specifically, if the corrected value $\Delta P'$ is less than the prescribed value, the evaluation section 343 evaluates that airtightness of the case 52 is assured, but if the corrected value $\Delta P'$ is greater than or equal to the prescribed value, the evaluation section 343 evaluates that airtightness of the case 52 is not assured.

—Flow of Control—

Figure 7:
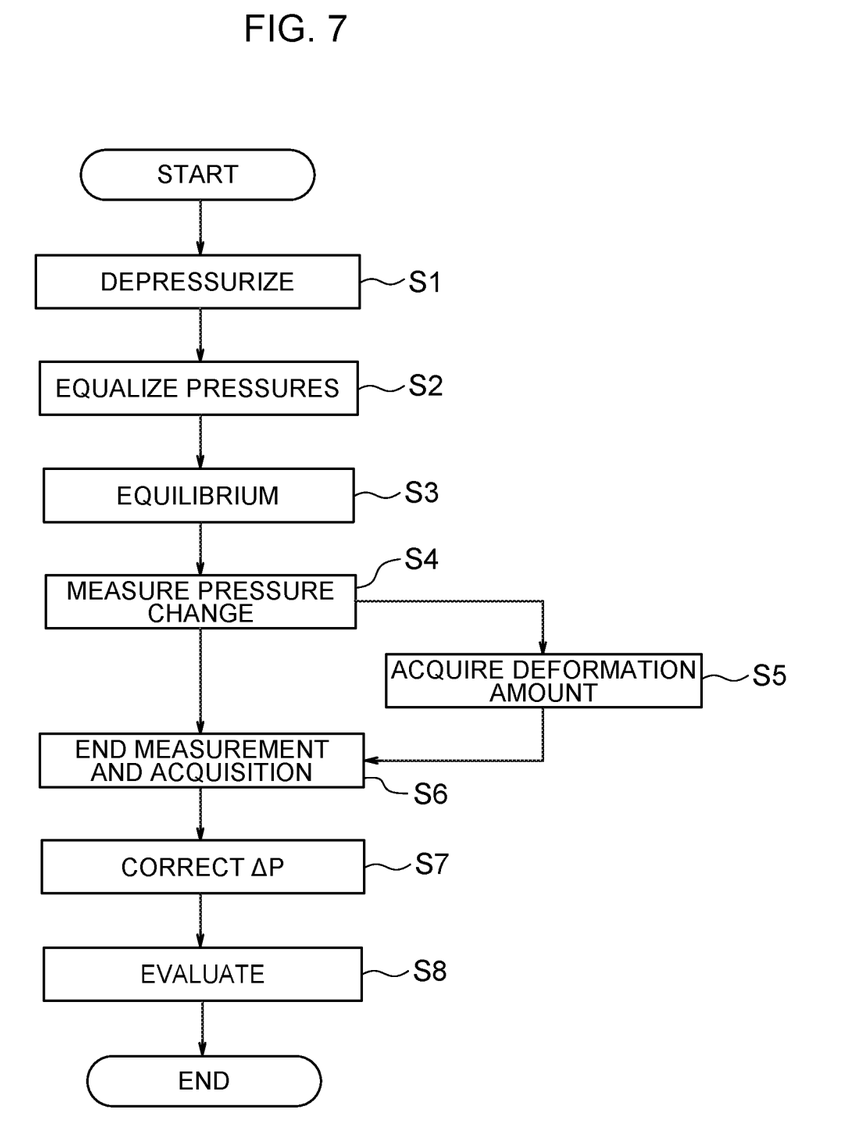
FIG. 7 is a flowchart showing a flow of processing executed by the control apparatus of the evaluation device.

Now, a flow of control by the control apparatus 34 is described using FIG. 7. The CPU 34A of the control apparatus 34 starts execution of the program, for example, when a switch that is not shown in the drawings, which is provided at the user interface 36, is turned on. In this program, the CPU 34A embodies the pressure measuring step with steps S1 to step S4, embodies the change amount acquiring step with step S5, embodies the correcting step with step S7, and embodies the evaluating step with step S8.

Specifically, in step S1, the CPU 34A operates the vacuum pump 18 of the leak tester 12 to depressurize air in the case 52 and air in the master chamber 16.

Then, in step S2, the CPU 34A isolates the interior of the case 52 and interior of the master chamber 16 from the vacuum pump 18 with the valve, which is not shown in the drawings, provided at the leak tester 12. As a result, pressure in the case 52 and pressure in the master chamber 16 equalize (and stabilize).

In step S3, the CPU 34A isolates the interior of the case 52 from the interior of the master chamber 16 with a valve, which is not shown in the drawings, provided at the leak tester 12, and the CPU 34A waits until pressure in the case 52 is stable (in an equilibrium state). At this time, if there is a site at which air leaks into the case 52, pressure in the case 52 decreases due to air leaking into the case 52 through this site.

In step S4, the CPU 34A measures a pressure difference between the interior of the case 52 and the interior of the master chamber 16, which is to say the pressure change $\Delta P$ in the case 52, with the differential pressure sensor provided at the leak tester 12.

In step S5, the CPU 34A acquires a deformation amount $\Delta x$ of the case 52 during the measurement of the pressure change $\Delta P$. More specifically, the CPU 34A measures the deformation amounts $\Delta x1$, $\Delta x2$ and $\Delta x3$ at the plural points P1, P2 and P3 of the case 52 with the displacement sensors 38A, 38B and 38C, and acquires the average thereof to be used as the deformation amount $\Delta x$ of the case 52.

In step S6, the CPU 34A ends the measurement of the pressure change $\Delta P$ and the acquisition of the deformation amount $\Delta x$ of the case 52.

In step S7, the CPU 34A finds the corrected value $\Delta P'$ of the pressure change by subtracting the deformation amount $\Delta x$ multiplied by the correction coefficient $\alpha$ from the pressure change $\Delta P$.

In step S8, the CPU 34A makes a determination as to whether this corrected value $\Delta P'$ is less than the prescribed value, and evaluates airtightness of the case 52. When the processing of step S8 is complete, execution of the present program is ended.

—Operation and Effects—

Now, operation and effects of the present exemplary embodiment are described.

The evaluation device 10 with the structure described above evaluates airtightness of the case 52 of the battery pack 50 mounted at a road vehicle. The leak tester 12 that serves as the pressure measuring section of the evaluation device 10 pressurizes or depressurizes air inside the case 52 and, after pressure in the case 52 has stabilized, measures a pressure change $\Delta P$ in the case 52. The deformation amount acquisition section 341 acquires a deformation amount $\Delta x$ of a specific location of the case 52 during the measurement of the pressure change $\Delta P$. The correction section 342 corrects the pressure change $\Delta P$ on the basis of the deformation amount $\Delta x$, calculating a corrected value $\Delta P'$ of the pressure change $\Delta P$. The evaluation section 343 evaluates airtightness of the case 52 on the basis of the corrected value $\Delta P'$. According to this evaluation device 10, because a measurement error of the pressure change $\Delta P$ due to deformation of the case 52 is corrected by the correction section 342, airtightness of the case 52 may be evaluated accurately by the evaluation section 343.

To expand on the above description of an effect, a usual air leak test employing the leak tester 12 may take account of deformation continuing due to creep of the upper case 56: measurement accuracy of a pressure change $\Delta P$ may be improved to some extent by setting a time of measurement of the pressure change $\Delta P$ to be longer. In the present exemplary embodiment, by contrast, because the measurement error of the pressure change $\Delta P$ is corrected as described above, a precise air leakage amount may be evaluated accurately in a short time.

In addition, in the present exemplary embodiment the deformation amount acquisition section 341 acquires the average value of the deformation amounts $\Delta x1$, $\Delta x2$ and $\Delta x3$ at the plural points P1, P2 and P3 of the case 52 to serve as the deformation amount $\Delta x$ of the specific location. Thus, a deformation amount of the case 52 may be acquired more accurately than when a deformation amount of only a single location of the case 52 is acquired.

In the present exemplary embodiment, the deformation amount acquisition section 341 acquires deformation amounts of locations at which deformations of the case 52 caused by depressurization of the air in the case 52 are relatively large. Thus, changes in the deformation amount $\Delta x$ may be identified more easily than when deformation amounts are acquired at locations at which these deformations are relatively small.

In the present exemplary embodiment, the locations at which deformations are relatively large are verified by CAE analysis. Thus, these locations may be verified quickly and easily.

In the present exemplary embodiment, the correction section 342 calculates the corrected value ΔP' of the pressure change by subtracting, from the change amount ΔP measured by the leak tester 12, the deformation amount Δx acquired by the deformation amount acquisition section 341 multiplied by the correction coefficient α. This correction coefficient α is determined by verifying a correlation between deformation amounts of the case 52 and pressure changes ΔP in the case 52, by measurements using an actual specimen of the case 52 or by CAE analysis. Thus, the corrected value ΔP' may be found accurately.

In the present exemplary embodiment, airtightness of the case 52 of the battery pack 50 may be evaluated accurately. Therefore, when a high level of waterproofing (watertightness) is required for the case 52, accuracy of evaluation of the waterproofing is improved.

—Supplementary Descriptions of the Exemplary Embodiment—

The exemplary embodiment described above is described as evaluating airtightness of the case 52 of the battery pack 50, but this is not limiting. The "case" of the present disclosure may be, for example, a case of an autonomous driving apparatus that controls autonomous driving of a road vehicle, and may be a case inside which an electrical apparatus other than a battery is accommodated.

In the exemplary embodiment described above, locations at which deformation of the case 52 during depressurization is relatively large are verified by CAE analysis, but this is not limiting. The locations may be verified by measurements using an actual specimen of the case 52.

In the exemplary embodiment described above, the deformation amount acquiring step acquires a deformation amount at a location at which deformation of the case 52 during depressurization is relatively large, but this is not limiting. That is, the deformation amount acquiring step may acquire a deformation amount at a location at which this deformation is relatively small.

In the pressure measuring step of the exemplary embodiment described above, the air in the case 52 is depressurized, but this is not limiting. In the pressure measuring step, the air in the case 52 may be pressurized by a pump or the like.

In the exemplary embodiment described above, the deformation amount acquiring step acquires an average value of deformation amounts at plural locations of the case 52 to serve as the deformation amount of the specific location of the case 52, but this is not limiting. That is, the deformation amount acquiring step may acquire a deformation amount of a single location of the case 52.

In the exemplary embodiment described above, the case 52 that is the object of airtightness evaluation is mounted at a vehicle that is a road vehicle, but this is not limiting. The "vehicle" of the present disclosure may be an aircraft such as, for example, a manned multicopter or such, or a boat or the like.

It will be clear that numerous modes may be embodied within a scope that does not depart from the gist of the present disclosure. It will also be clear that the scope of the present disclosure is not to be limited to the exemplary embodiment described above.

What is claimed is:

1. A case airtightness evaluation method for evaluating airtightness of a case mounted at a vehicle, the method comprising:
   a pressure measuring step including
      pressurizing or depressurizing air in the case,
      allowing pressure in the case to stabilize, and
      thereafter, measuring a pressure change in the case;
   a deformation amount acquiring step of, during the measuring of the pressure change, acquiring a deformation amount of a specific location of the case;
   a correcting step of correcting the measured pressure change based on the acquired deformation amount; and
   an evaluating step of evaluating airtightness of the case based on the corrected pressure change.

2. The case airtightness evaluation method according to claim 1, wherein
   the specific location is a plurality of locations of the case, and
   the deformation amount of the specific location acquired in the deformation amount acquiring step is an average value of deformation amounts of the plurality of locations.

3. The case airtightness evaluation method according to claim 1, wherein the case is a case of a battery pack.

4. The case airtightness evaluation method according to claim 1, wherein:
   the case includes a lower case constituted of a light metal and an upper case constituted of a resin, and
   the deformation amount acquiring step includes acquiring a deformation amount of a specific location of the upper case.

5. The case airtightness evaluation method according to claim 1, wherein the pressure measuring step is implemented with a differential pressure-type leak tester.

6. The case airtightness evaluation method according to claim 1, wherein, when
   the measured pressure change is represented by ΔP,
   the acquired deformation amount is represented by Δx,
   the corrected pressure change is represented by ΔP', and
   a correction coefficient that is determined by verifying a correlation between deformation amounts of the case and pressure changes in the case is represented by α, the verifying including measurements using an actual specimen of the case or CAE analysis,
   the correcting step includes calculating ΔP' from ΔP'=ΔP−αΔx.

7. The case airtightness evaluation method according to claim 6, wherein the correction coefficient α is found from a gradient of a graph of a plot plotting data obtained from the measurements or the CAE analysis.

8. A case airtightness evaluation device for evaluating airtightness of a case mounted at a vehicle, the device comprising:
   a pressure measurement section that
      pressurizes or depressurizes air in the case,
      allows pressure in the case to stabilize, and
      thereafter, measures a pressure change in the case;
   a deformation amount acquisition section that, during the measuring of the pressure change by the pressure measurement section, acquires a deformation amount of a specific location of the case;
   a correction section that corrects the measured pressure change based on the deformation amount acquired by the deformation amount acquisition section; and
   an evaluation section that evaluates airtightness of the case based on the pressure change corrected by the correction section.

* * * * *